March 20, 1945.   C. W. SADLER   2,372,123
CLUTCH
Filed Nov. 9, 1943
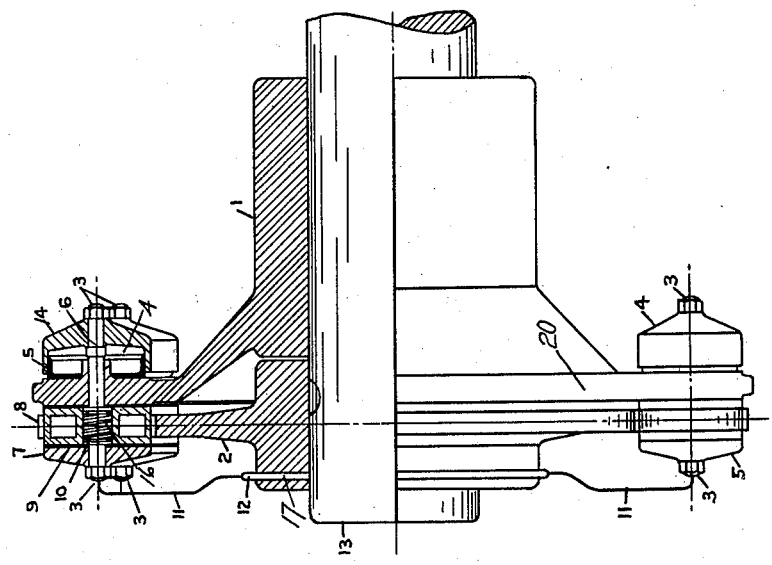
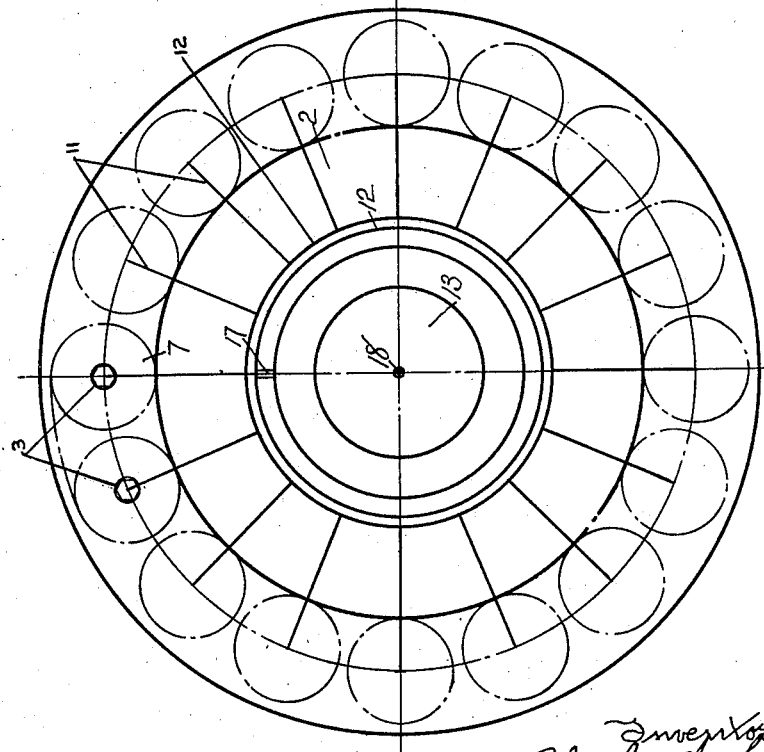

Patented Mar. 20, 1945

2,372,123

UNITED STATES PATENT OFFICE 2,372,123

CLUTCH

Charles W. Sadler, Essex, Conn.

Application November 9, 1943, Serial No. 509,551

6 Claims. (Cl. 74—295)

My invention relates to the class of mechanisms that are employed for connecting and disconnecting devices commonly of a rotating character so that motion is communicated from one to the other of said devices, and an object of my invention, among others, is the provision of a device of this type that shall be simple in construction and particularly effective in the results obtained in its operation.

One form of a device embodying my invention and in the construction and use of which the objects herein set out, as well as others, may be attained, is illustrated in the accompanying drawing, in which—

Figure 1 is a view in end elevation of my improved clutch device, this view being more or less of diagrammatical character and some of the parts being therefore represented by single lines only.

Figure 2 is a view partially in central lengthwise section of the device which is also represented in a more or less diagrammatical manner.

In the accompanying drawing the numeral 13 denotes a driving shaft to which rotating motion may be imparted as by a belt or gears or any other suitable devices common to structures of this type. The hub of a larger gear 2 is keyed to the shaft 13 and the hub 1 of a supporting disk 20 for clutch members is loosely mounted upon the shaft 13. Studs 6 of a tubular form are supported by the disk 20 at intervals therearound for the support of pinions 8 in close relation, which pinions mesh with the teeth of the large gear 2. These pinions are each supported upon ball bearings 10 of both a thrust and radial type, and springs 16 located between said ball bearings exert an outward pressure thereon to force them apart.

Friction washers 9 of leather, fiber, or other suitable clutch material are located upon opposite sides of each pinion, the studs passing through said washers, ball bearings, pinions and supporting disk 20 and being loosely supported in the latter. A cap 14 is mounted upon each of the studs 6, these caps being secured in place as by means of nuts or other suitable fastenings 3. The caps are hollow to provide air chambers 4 and dish-shaped washers 5 are located within the caps to pack the joint between the edge of each cap and the face of the supporting disk 20. The studs 6 are provided with holes opening from the passages therein into the chambers 4 for the admission of air under pressure into said chambers.

Plates 7 are loosely supported upon the studs 6 adjacent the pinions 8, the friction washers 9 being located between said plates and the pinions and also between the pinions and the face of the supporting disk 20, as hereinbefore related.

An air passage 18 extends axially into the driving shaft 13 from the end thereof and an air tube 17 extends from said passage radially through the driving shaft and the hub of the gear 2, said tube communicating with an air tube 12 extending around the hub of the gear 2 and firmly secured thereto. Air tubes 11 extend from the tube 12 and communicate with the passages in the studs 6, these tubes 11 being shown herein by single lines to simplify the illustration.

From the description herein made it will be noted that air admitted into the passage 18 through a tube not herein shown, but which may be provided with any suitable means for controlling the flow of air, pressure will be created in the passage 18, air tubes 17, 12 and 11 which will also appear in the studs 6, and the pressure thus created in the chamber 4 will be exerted upon the cap 14, studs 6, and plates 7 thereby forcing the pinions 8 laterally into contact with the face of the supporting disk 20, and thereby locking the pinions against rotation and causing rotation of the gear 2 to be communicated to the supporting disk 20 and its hub 1, which hub may be supplied with any suitable means for conveying its motion to any other rotatable device as may be desired.

While the driving shaft 13 has been indicated herein as the driving member it will be noted that the hub 1 of the supporting disk 20 may constitute the driving member from power transmitted to said hub and which motion may be communicated in a direction opposite to that above described to the gear 2 and the shaft 13.

I claim:

1. A clutch comprising a driving member, a driven member, one of said members comprising a support, a gear rigid with one of said members, a set of gears closely associated and rotatably mounted on said supporting member in mesh with said first mentioned gear, tubes projecting through said support, said set of gears each being mounted upon one of said tubes upon one side of said support, a cap forming an air chamber supported upon the opposite end of each of said tubes, ports opening from said tubes into said air chambers, and means for supplying air under pressure to said tubes to clamp said set of gears to said support to effect clutching action between said driving and driven members.

2. A clutch comprising a driving member, a driven member, one of said members comprising a support, a gear rigid with one of said members, a set of gears closely associated and rotatably mounted on said supporting member in mesh with said first mentioned gear, supporting tubes projecting loosely through said support, said set of gears each being mounted one upon each tube, a cap forming an air chamber supported upon each tube on the opposite side of said support from one of the gears of said set of gears, and means for supplying air under pressure to said tubes for expansion in said air chambers to draw said caps and said tubes within said support and thereby clamp said set of gears to said support to effect clutching action between said driving and driven members.

3. A clutch comprising a driving member, a driven member, one of said members comprising a support, a gear rigid with one of said members, a set of supporting tubes closely associated and extending through said support, a gear loosely mounted upon each of said tubes in engagement with said first mentioned gear on one side of said support, a clutch disk mounted upon each of said tubes between each gear of said set of gears and said support, a cap mounted upon each of said tubes on the other side of said support and forming an expansion chamber communicating with the passage in one of said tubes, and means for supplying air under pressure to each of said tubes for expansion in said chamber to draw said set of gears into non-rotating engagement with said support thereby to effect clutching connection between said driving and driven members.

4. A clutch comprising a driving member, a driven member, one of said members comprising a support, a gear rigid with one of said members, a set of supporting tubes closely associated and extending loosely through said support, a gear loosely mounted upon each of said tubes in engagement with said first mentioned gear on one side of said support, clutch disks mounted upon each of said tubes upon opposite sides of each gear of said set of gears, one of said disks appurtenant to each gear of said set of gears being located between said gear and said support, a cap mounted upon each of said tubes on the other side of said support and forming an expansion chamber communicating with the passage in one of said tubes, and means for supplying air under pressure to each of said tubes for expansion in said chamber to draw said set of gears into non-rotating engagement with said support, thereby to effect clutching action between said driving and driven members.

5. A clutch comprising a driving member, a driven member, one of said members comprising a support, a gear rigid with one of said members, a set of gears closely associated and rotatably mounted on said supporting member in mesh with said first mentioned gear, a tube projecting loosely through said support and affording a mount for each gear of said set of gears on one side of said support, a cap mounted on each of said tubes on the opposite side of said support from a gear of said set of gears, a clutching disk mounted on each tube between each gear of said set of gears and said support, the passages in said tubes communicating with the chambers in said caps, a cap mounted on the end of each tube on the opposite side of each gear of said set of gears from said support, and means for supplying air under pressure to said chambers to effect clutching connection between said driving and driven members.

6. A clutch comprising a driving member, a driven member, one of said members comprising a support, a gear rigid with one of said members, a set of gears closely associated and rotatably mounted on said supporting member in mesh with said first mentioned gear, a tubular support carried by said supporting member and affording a mount for each gear of said set of gears, a shaft supporting said driving and driven members, an air passage in said shaft, a passage leading from the passage in said shaft into a passage in each of said tubular supports, expansion members mounted on each of said tubular supports and having expansion chambers therein, and openings from said tubular members into said expansion chamber for supply of air under pressure in said chamber to effect clutching action between said driving and driven members.

CHARLES WM. SADLER.